(12) United States Patent
Wu et al.

(10) Patent No.: US 10,293,563 B2
(45) Date of Patent: May 21, 2019

(54) RUBBER V-BELT YARN BLANK COATING AND CUTTING DEVICE

(71) Applicant: SANLUX CO., LTD, Shaoxing County, Zhejiang Province (CN)

(72) Inventors: Peisheng Wu, Shaoxing County, Zhejiang Province (CN); Shuixiang Shi, Shaoxing County, Zhejiang Province (CN); Xinfu Zhu, Shaoxing County, Zhejiang Province (TW); Lixiang Wu, Shaoxing County, Zhejiang Province (TW)

(73) Assignee: SANLUX CO., LTD, Shaoxing County, Zhejiang Province (CN)

( * ) Notice: Subject to any disclaimer, the term of this patent is extended or adjusted under 35 U.S.C. 154(b) by 652 days.

(21) Appl. No.: 14/929,660

(22) Filed: Nov. 2, 2015

(65) Prior Publication Data
US 2016/0121566 A1 May 5, 2016

(30) Foreign Application Priority Data
Oct. 31, 2014 (CN) .......................... 2014 1 0599564

(51) Int. Cl.
*B29D 29/10* (2006.01)
*B29D 29/00* (2006.01)
*B29K 21/00* (2006.01)

(52) U.S. Cl.
CPC .......... *B29D 29/10* (2013.01); *B29K 2021/00* (2013.01)

(58) Field of Classification Search
CPC ............ B29C 47/0021; B29C 47/0064; B29C 47/0066; B29C 47/34; B29D 29/00; B29D 29/10; B65H 20/34
See application file for complete search history.

(56) References Cited

U.S. PATENT DOCUMENTS

| | | | | |
|---|---|---|---|---|
| 3,291,674 A | * | 12/1966 | Worrall, Jr. ............ | B29D 29/10 156/353 |
| 3,775,221 A | * | 11/1973 | Reinhart ................ | B29D 29/00 156/460 |
| 3,818,576 A | * | 6/1974 | Braden ................... | B23P 13/00 264/159 |

* cited by examiner

*Primary Examiner* — Mark A Osele
*Assistant Examiner* — Christopher C Caillouet
(74) *Attorney, Agent, or Firm* — Muncy, Geissler, Olds & Lowe, P.C.

(57) ABSTRACT

A rubber V-belt yarn blank coating and cutting device is described herein. The rubber V-belt yarn blank coating and cutting device is numerically controlled and includes a frame and a base compound rubber leading-out device, a base compound rubber conveying device, and a base compound rubber coating and cutting mechanism sequentially disposed on the frame. The base compound rubber coating and cutting mechanism includes a driving roller and a driven tensioning roller disposed on the frame and further includes grouped round cutting knives and a squeezing roller. The squeezing roller is positioned between the driving roller and the driven tensioning roller, and the grouped round cutting knives with a sliding mechanism are disposed above the squeezing roller. The coating and cutting device in the present invention is simple in structure, high in cutting precision, labor efficiency and operational safety, and convenient to mount.

9 Claims, 3 Drawing Sheets

RUBBER V-BELT YARN BLANK COATING AND CUTTING DEVICE

CROSS-REFERENCE TO RELATED APPLICATIONS

This Non-provisional application claims priority under 35 U.S.C. § 119(a) on Patent Application No(s). 201410599564.1 filed in People's Republic of China on Oct. 31, 2014, the entire contents of which are hereby incorporated by reference.

BACKGROUND OF THE INVENTION

Field of the Invention

The present invention belongs to a manufacturing technical field of a rubber V-belt molding apparatus and, more particular, relates to a rubber V-belt yarn blank coating and cutting device.

Description of the Related Art

Yarn blank is the yarn yet to be treated. Existing fiber yarn blank molding apparatus for rubber V-belts generally includes a driving roller and a driven tensioning roller. When the fiber yarn is cut, an integral fiber yarn blank formed after fiber yarn cords and inner and outer rubber layers are twisted and compounded is mounted between the driving roller and the driven tensioning roller. After the driven tensioning roller is tensioned, the integral fiber yarn blank is manually cut strip by strip. The fiber yarn blank cutting apparatus has the following problems.

1. The yarn blank cutting precision is low, and the defective rate is high. When the yarn blank is cut, the yarn blank cannot be accurately cut according to the technical requirement, so that the quality of a single yarn blank and a cord after the cutting is affected, and rejected products are easily produced.

2. The labor efficiency of manual cutting strip-by-strip is low. If 5×3 cord fiber yarns are utilized for winding a B-type rubber V-belt yarn blank, 154 cords may be generally wound at one time. Then, every seven cords form one group, and the cords are cut group by group for 21 times, thus to obtain 22 groups of yarn blanks.

3. Labor safety, health protection and the like cannot be guaranteed. When workers manually carry out cutting, their hands touch cutting knives, and industrial injury accidents are easy to happen.

BRIEF SUMMARY OF THE INVENTION

To overcome the above defects, the present invention provides a rubber V-belt yarn blank coating and cutting device with reasonable design and simple structure, for achieving the purposes of high cutting precision, labor efficiency, operational safety, and mounting convenience.

To realize the above objective, the present invention adopts the following technical solution.

A rubber V-belt yarn blank coating and cutting device is numerically controlled and includes a frame, a base compound rubber leading-out device, a base compound rubber conveying device, and a base compound rubber coating and cutting mechanism. The base compound rubber leading-out device, the base compound rubber conveying device, and the base compound rubber coating and cutting mechanism are sequentially disposed on the frame. The base compound rubber coating and cutting mechanism includes a driving roller disposed on the frame, a driven tensioning roller disposed on the frame, grouped round cutting knives, and a squeezing roller. The squeezing roller is positioned between the driving roller and the driven tensioning roller, and the grouped round cutting knives having a sliding mechanism are disposed above the squeezing roller.

According to one embodiment of the invention, the base compound rubber leading-out device may include a base compound rubber reel, a base compound rubber flattening mechanism, and a base compound rubber leading-out mechanism. The base compound rubber reel, the base compound rubber flattening mechanism, and the base compound rubber leading-out mechanism may be mounted on the frame sequentially.

According to one embodiment of the invention, the base compound rubber conveying device may include a base compound rubber guiding pressing block, a base compound rubber conveying rack, a base compound rubber clamping mechanism, and a base compound rubber oblique cutting tool. The base compound rubber guiding pressing block and the base compound rubber conveying rack may be sequentially mounted on the frame. The base compound rubber clamping mechanism and the base compound rubber oblique cutting tool may be disposed on the base compound rubber conveying rack.

According to one embodiment of the invention, the sliding mechanism may include a synchronous belt pulley, a mold plate, and a movable lead screw. The synchronous belt pulley may be disposed on the frame and have a drive motor. The mold plate may be disposed above the grouped round cutting knives. The movable lead screw may be disposed on the mold plate and engaged with the synchronous belt pulley.

According to one embodiment of the invention, the rubber V-belt yarn blank coating and cutting device further include a data acquisition unit, and the data acquisition unit may be disposed on a rotating shaft of the drive motor and automatically controlled by a programmable logic controller (PLC).

According to one embodiment of the invention, the rubber V-belt yarn blank coating and cutting device may further include a guide sleeve and a guide post. The guide sleeve may be disposed on the frame, and the guide post may be placed in the guide sleeve and disposed on the mold plate.

According to one embodiment of the invention, the rubber V-belt yarn blank coating and cutting device may further include an upper mold and a lower mold. The upper mold and the lower mold may be disposed on the mold plate, and a distance adjusting mechanism may be disposed on the lower mold and include a distance adjusting device disposed on the lower mold.

According to one embodiment of the invention, the upper mold and the lower mold may be dovetail shaped.

According to one embodiment of the invention, the grouped round cutting knives may be positioned below the distance adjusting mechanism and locked by a core shaft and a spacing gasket.

According to one embodiment of the invention, the grouped round cutting knives may slide up and down through rotation of concentric double shafts.

In conclusion, the present invention has the beneficial effects: the design of the present invention is reasonable. The base compound rubber coating and cutting mechanism is additionally disposed on a base compound rubber yarn blank molding apparatus. Base compound rubber is coated on a yarn blank in a grouped manner, and the integral base compound rubber and yarn blank is mechanically cut by the grouped round cutting knives, so that the problems that the precision and the production efficiency are low, the safety cannot be guaranteed and the like due to manual cutting strip-by-strip in the prior art are radically solved. The rubber V-belt yarn blank coating and cutting device provided by the present invention can be used as a supporting device for a processing apparatus of rubber V-belts or polymer chemical materials.

Further, through the sliding mechanism, particularly under the engaging action of the synchronous belt pulley and the lead screw, the grouped round cutting knives are driven to slide up and down, so as to complete numerical control grouped cutting operation. Meanwhile, the grouped round cutting knives are accurately guided and automatically positioned by cooperating with the distance adjusting mechanism disposed on the lower mold, so that after the grouped round cutting knives enters cord intervals to press and cut, the round cutting knives will not shift relatively.

In addition, through the data acquisition unit, feeding displacement of the round cutting knives is automatically controlled by the PLC, so that the precision is high and the labor intensity is low. Thus, the processing quality of cutting by groups and the working efficiency are improved.

DETAILED DESCRIPTION OF THE INVENTION

The present invention will be described in detail below in combination with the accompanying drawings.

Figure 1:
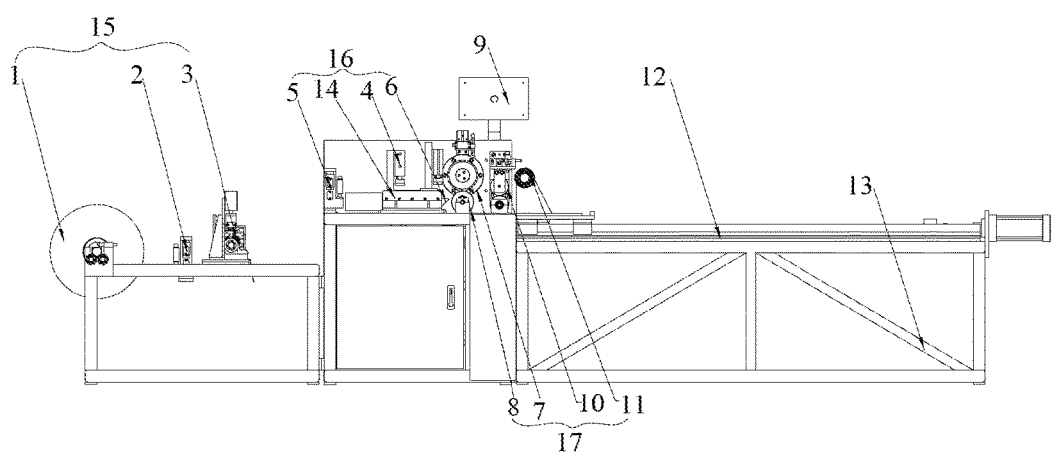
FIG. 1 is a front view showing a rubber V-belt yarn blank coating and cutting device according to one embodiment of the present invention.
Figure 2:
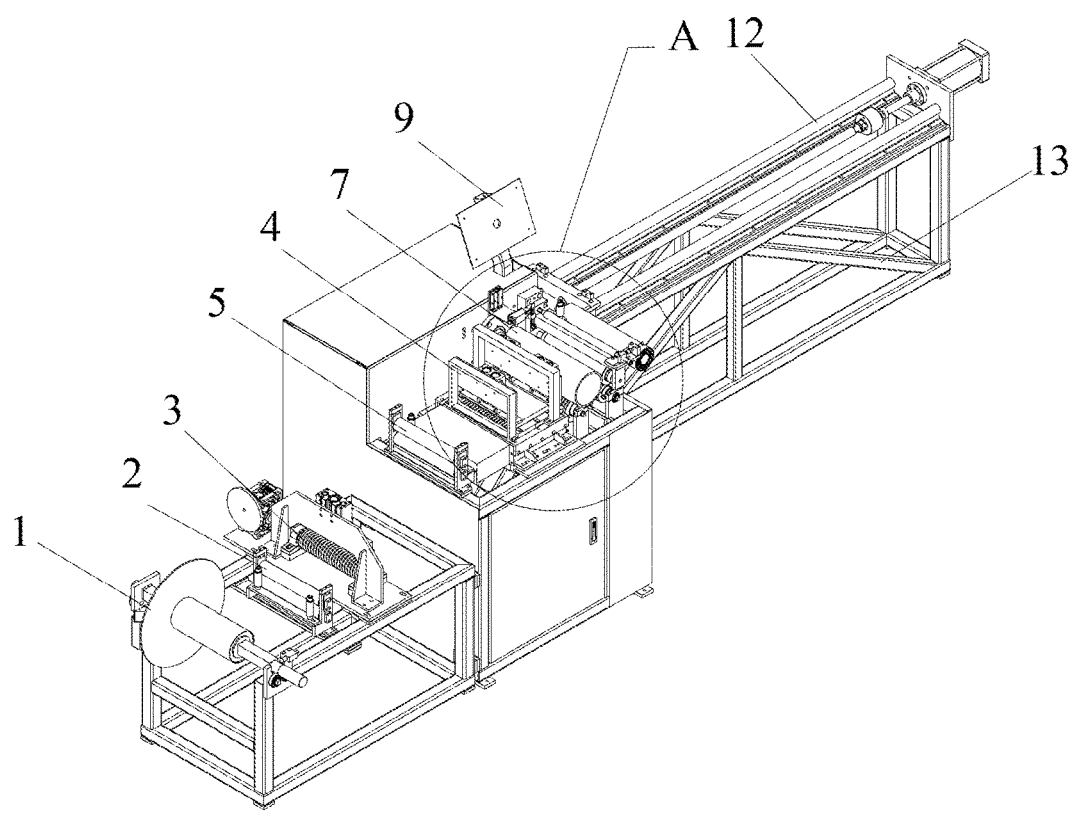
FIG. 2 is a perspective schematic diagram showing the rubber V-belt yarn blank coating and cutting device in FIG. 1.

FIG. 1 is a front view showing a rubber V-belt yarn blank coating and cutting device FIG. 2 is a perspective schematic diagram showing the rubber V-belt yarn blank coating and cutting device in FIG. 1. As shown in FIG. 1 and FIG. 2, the rubber V-belt yarn blank coating and cutting device is numerically controlled and includes a frame 13, a base compound rubber leading-out device 15, a base compound rubber conveying device 16, and a base compound rubber coating and cutting mechanism 17. The base compound rubber leading-out device 15, the base compound rubber conveying device 16, and the base compound rubber coating and cutting mechanism 17 are sequentially disposed on the frame 13 from left to right. The cutting device further includes a numerical control panel 9.

The frame 13 is mounted on the ground and plays a role in supporting the whole cutting device.

The leftmost is the base compound rubber leading-out device 15 including a base compound rubber reel 1, a base compound rubber flattening mechanism 2, and a base compound rubber leading-out mechanism 3. The base compound rubber reel 1, the base compound rubber flattening mechanism 2, and the base compound rubber leading-out mechanism 3 are mounted on the frame 13 sequentially.

The base compound rubber reel 1 is a part where a base compound rubber raw material is stored and delivered, and the base compound rubber raw material is reeled on the base compound rubber reel 1 for later use.

The base compound rubber flattening mechanism 2 is used for flattening base compound rubber conveyed by the base compound rubber reel 1 to facilitate a later coating procedure.

The base compound rubber leading-out mechanism 3 electrically leads out and conveys the base compound rubber to the base compound rubber conveying device 16.

The base compound rubber conveying device 16 sequentially includes a base compound rubber guiding pressing block 5, a base compound rubber conveying rack 14, a base compound rubber clamping mechanism 4, and a base compound rubber oblique cutting tool 6. The base compound rubber guiding pressing block 5 and the base compound rubber conveying rack 14 are sequentially mounted on the frame 13 from left to right. The base compound rubber clamping mechanism 4 and the base compound rubber oblique cutting tool 6 are disposed on the base compound rubber conveying rack 14.

The base compound rubber clamping mechanism 4 is used for clamping and fixing the base compound rubber. The base compound rubber is conveyed from the base compound rubber leading-out mechanism 3, and after being clamped by the base compound rubber clamping mechanism 4, the base compound rubber is conveyed to the base compound rubber guiding pressing block 5 for guiding.

The base compound rubber oblique cutting tool 6 is used for cutting off the grouped base compound rubber.

The base compound rubber coating and cutting mechanism 17 includes a driving roller 7, a driven tensioning roller 11, and a cutting mechanism 10. The driving roller 7, the driven tensioning roller 11, and the cutting mechanism 10 are disposed on the frame 13. In this embodiment, the base compound rubber coating and cutting mechanism 17 further includes a base compound rubber pressing roller 8 cooperating with the driving roller 7.

The yarn blank is loaded onto the driving roller 7 and the driven tensioning roller 11.

The base compound rubber pressing roller 8 is disposed below the driving roller 7 for pressing the grouped base compound rubber on the yarn blank on the driving roller 7.

Figure 3:
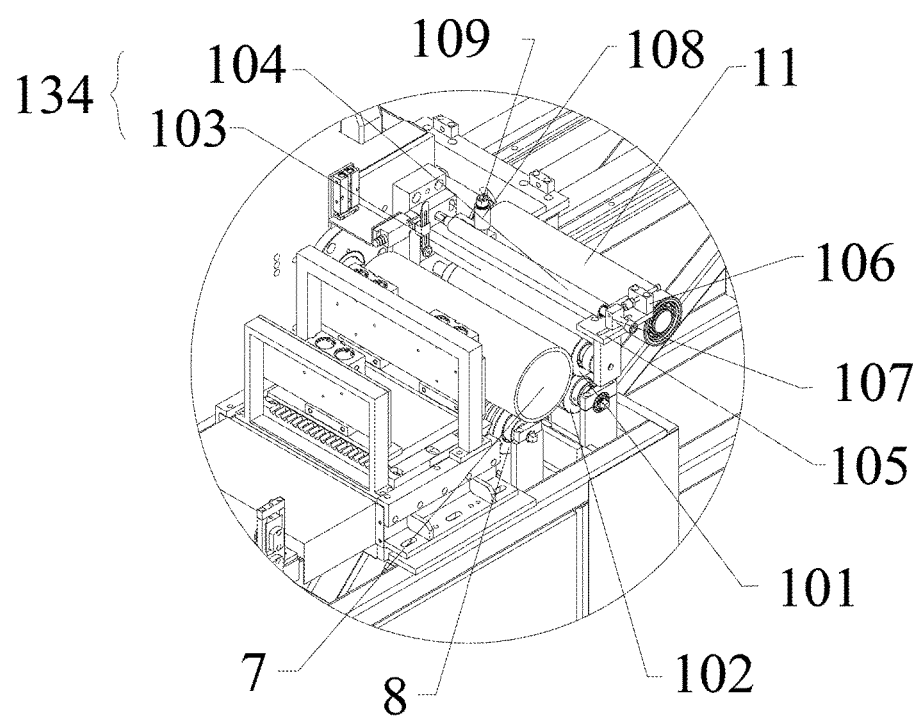
FIG. 3 is a partial enlarged schematic diagram of A in FIG. 2.

FIG. 3 is a partial enlarged schematic diagram of A in FIG. 2. It could be seen from FIG. 3 that, the cutting mechanism 10 includes grouped round cutting knives 101 and a squeezing roller 102. Since several cords of the yarn blank form a group and the yarn blank is cut by groups of the cords, the grouped round cutting knives 101 refer that the number of the round cutting knives corresponds to the number of the cords in one group.

The squeezing roller 102 is positioned between the driving roller 7 and the driven tensioning roller 11, and the grouped round cutting knives 101 are disposed above the squeezing roller 102.

The grouped round cutting knives 101 are used for cutting the yarn blank on which the base compound rubber has already been coated in a grouped manner and are provided with a sliding mechanism 134. The sliding mechanism 134 includes a synchronous belt pulley (not shown in the figure), a mold plate 103, and a movable lead screw 104.

The synchronous belt pulley is disposed on the frame 13 and provided with a drive motor (not shown). A data acquisition unit is disposed on a rotating shaft of the drive motor and automatically controlled by a programmable logic controller (PLC). The data acquisition unit transmits data to a PLC control system so as to accurately control the displacement of the grouped round cutting knives 101.

The mold plate 103 is disposed above the grouped round cutting knives 101, and an upper mold 106 and a lower mold 105 are further disposed on the mold plate 103. The upper mold 106 and the lower mold 105 may be in various shapes according to different requirements. In one preferred embodiment, both the upper mold 106 and the lower mold 105 are dovetail shaped.

A distance adjusting mechanism 107 is disposed on the lower mold 105 and includes a distance adjusting device disposed on the lower mold 105.

The grouped round cutting knives 101 are positioned below the distance adjusting mechanism 107 and locked by a core shaft and a spacing gasket.

A guide post 109 is disposed on the mold plate 103 for accurately positioning the grouped round cutting knives 101. The guide post 109 is positioned in a guide sleeve 108 disposed on the frame 13.

The movable lead screw 104 is disposed on the mold plate 103 and engaged with the synchronous belt pulley. The grouped round cutting knives 101 slide up and down through rotation of concentric double shafts. Specifically, the drive motor drives a synchronous belt, and a shaft of the synchronous belt pulley rotates on the frame 13 in a gapless manner under the action of upper and lower thrust bearings; and the center of the shaft of the synchronous belt pulley is engaged with the movable lead screw 104, and when the synchronous belt pulley rotates, the movable lead screw 104 is engaged to slide up and down, so that tight transmission of two shafts is realized. Therefore, the grouped round cutting knives 101 can slide up and down.

When rubber V-belt yarn blank coating and cutting device in the invention works, a power supply is started, and the type and specification of the yarn blank is input on the numerical control panel 9. The driven tensioning roller 11 is automatically fed to a standard size, and the yarn blank is loaded onto the driving roller 7 and the driven tensioning roller 11. The driven tensioning roller 11 tensions automatically, and the driving roller 7 rotates. Then the yarn blank is positioned, and the yarn blank is flattened at the same time.

The base compound rubber on the base compound rubber reel 1 passes through the base compound rubber flattening mechanism 2 and is electrically led out from the base compound rubber leading-out mechanism 3. The led out base compound rubber is clamped by the base compound rubber clamping mechanism 4 and conveyed to the base compound rubber guiding pressing block 5. After being guided, the base compound rubber is obliquely cut by the base compound rubber oblique cutting tool 6, and then the grouped base compound rubber is delivered horizontally to attach the yarn blank on the driving roller 7 by the base compound rubber conveying rack 14.

The base compound rubber pressing roller 8 tightly presses the grouped base compound rubber onto the yarn blank on the driving roller 7. Under automatic control of the numerical control panel 9, the base compound rubber is pressed tightly onto the yarn blank and attached around the yarn blank, then the base compound rubber is obliquely cut by the base compound rubber oblique cutting tool 6, and the base compound rubber is automatically lapped and pressed. After the base compound rubber oblique cutting tool 6 cuts off the base compound rubber, the rest grouped base compound rubber automatically exits a coating state horizontally by the base compound rubber conveying rack 14 and waits for next mold operation.

After the base compound rubber is coated, when the attached base compound rubber and yarn blank pass through the base compound rubber yarn blank cutting mechanism 10, the grouped round cutting knives 101 of the base compound rubber yarn blank cutting mechanism 10 rises automatically, so that the attached base compound rubber and yarn blank can pass through; and then the grouped round cutting knives 101 move downwards under the action of the sliding mechanism 134 to cut into intervals and belt pitches of each group of cords till cutting to the squeezing roller 102 to realize automatic cutting of the base compound rubber and the yarn blank by groups. Therefore, the base compound rubber and the yarn blank are separated from each other strip by strip.

The attached base compound rubber and yarn blank are rotated for one circle by the driving roller 7 and completely separated by the base compound rubber yarn blank cutting mechanism 10, and the whole base compound rubber and yarn blank coating and cutting operation is completed. The driven tensioning roller 11 moves horizontally and relaxes in a guide rail 12, and the yarn blank coated with rubber can be taken out. The whole operation is completed, and a cycle phase of next operation will be carried out.

All the operations in the present invention are automatically controlled by the numerical control panel 9.

Although the present invention is disclosed above with preferred embodiments, the preferred embodiments are not used for limiting the present invention. Possible alterations and modifications may be made to the technical solutions of the present invention by using the method and technical contents disclosed above by those skilled in the art without departing from the spirit and scope of the present invention. Accordingly, any simple modification and equivalent alteration and modification, made to the above embodiments according to the technical essence of the present invention without departing from the contents of the technical solutions of the present invention, shall fall into the protection scope of the technical solutions of the present invention.

What is claimed is:

1. A rubber V-belt yarn blank coating and cutting device, comprising a frame, a base compound rubber leading-out device, a base compound rubber conveying device, and a base compound rubber coating and cutting mechanism, the base compound rubber leading-out device, the base compound rubber conveying device, and the base compound rubber coating and cutting mechanism are disposed on the frame, the base compound rubber coating and cutting mechanism comprising a driving roller disposed on the frame, a driven tensioning roller disposed on the frame, a base compound rubber pressing roller, grouped round cutting knives, and a squeezing roller, wherein the base compound rubber pressing roller is disposed below the driving roller for pressing the grouped base compound rubber on the yarn blank on the driving roller, wherein the squeezing roller is positioned between the driving roller and the driven tensioning roller, and the grouped round cutting knives having a sliding mechanism are disposed above the squeezing roller;

wherein the base compound rubber conveying device comprises a base compound rubber guiding pressing block, a base compound rubber conveying rack, a base compound rubber clamping mechanism, and a base compound rubber oblique cutting tool, the base compound rubber guiding pressing block and the base compound rubber conveying rack are mounted on the frame, the base compound rubber clamping mechanism and the base compound rubber oblique cutting tool are disposed on the base compound rubber conveying rack.

2. The rubber V-belt yarn blank coating and cutting device according to claim 1, wherein the base compound rubber leading-out device comprises a base compound rubber reel, a base compound rubber flattening mechanism, and a base compound rubber leading-out mechanism, and the base compound rubber reel, the base compound rubber flattening mechanism, and the base compound rubber leading-out mechanism are mounted on the frame.

3. The rubber V-belt yarn blank coating and cutting device according to claim 1, wherein the grouped round cutting knives slide up and down through rotation of concentric double shafts.

4. A rubber V-belt yarn blank coating and cutting device, comprising a frame, a base compound rubber leading-out device, a base compound rubber conveying device, and a base compound rubber coating and cutting mechanism, the base compound rubber leading-out device, the base compound rubber conveying device, and the base compound rubber coating and cutting mechanism are disposed on the frame, the base compound rubber coating and cutting mechanism comprising a driving roller disposed on the frame, a driven tensioning roller disposed on the frame, a base compound rubber pressing roller, grouped round cutting knives, and a squeezing roller, wherein the base compound rubber pressing roller is disposed below the driving roller for pressing the grouped base compound rubber on the yarn blank on the driving roller, wherein the squeezing roller is positioned between the driving roller and the driven tensioning roller, and the grouped round cutting knives having a sliding mechanism are disposed above the squeezing roller;

wherein the sliding mechanism comprises a synchronous belt pulley, a mold plate, and a movable lead screw, the synchronous belt pulley is disposed on the frame and has a drive motor, the mold plate is disposed above the grouped round cutting knives, and the movable lead screw is disposed on the mold plate and engaged with the synchronous belt pulley.

5. The rubber V-belt yarn blank coating and cutting device according to claim 4, further comprising a data acquisition unit, wherein the data acquisition unit is disposed on a rotating shaft of the drive motor and automatically controlled by a programmable logic controller (PLC).

6. The rubber V-belt yarn blank coating and cutting device according to claim 4, further comprising a guide sleeve and a guide post, wherein the guide sleeve is disposed on the frame, and the guide post is placed in the guide sleeve and disposed on the mold plate.

7. A rubber V-belt yarn blank coating and cutting device, comprising a frame, a base compound rubber leading-out device, a base compound rubber conveying device, and a base compound rubber coating and cutting mechanism, the base compound rubber leading-out device, the base compound rubber conveying device, and the base compound rubber coating and cutting mechanism are disposed on the frame, the base compound rubber coating and cutting mechanism comprising a driving roller disposed on the frame, a driven tensioning roller disposed on the frame, a base compound rubber pressing roller, grouped round cutting knives, and a squeezing roller, wherein the base compound rubber pressing roller is disposed below the driving roller for pressing the grouped base compound rubber on the yarn blank on the driving roller, wherein the squeezing roller is positioned between the driving roller and the driven tensioning roller, and the grouped round cutting knives having a sliding mechanism are disposed above the squeezing roller;

wherein the sliding mechanism comprises a synchronous belt pulley, a mold plate, and a movable lead screw, the synchronous belt pulley is disposed on the frame and has a drive motor, the mold plate is disposed above the grouped round cutting knives, and the movable lead screw is disposed on the mold plate and engaged with the synchronous belt pulley;

wherein the rubber V-belt yarn blank coating and cutting device comprises an upper mold and a lower mold, wherein the upper mold and the lower mold are disposed on the mold plate, and a distance adjusting mechanism is disposed on the lower mold.

8. The rubber V-belt yarn blank coating and cutting device according to claim 7, wherein the upper mold and the lower mold are dovetail shaped.

9. The rubber V-belt yarn blank coating and cutting device according to claim 7, wherein the grouped round cutting knives are positioned below the distance adjusting mechanism and locked by a core shaft and a spacing gasket.

* * * * *